(12) United States Patent
Golshokooh et al.

(10) Patent No.: US 10,137,393 B2
(45) Date of Patent: Nov. 27, 2018

(54) METHODS FOR FABRICATING POROUS MEDIA WITH CONTROLLABLE CHARACTERISTICS

(71) Applicants: Saeed Golshokooh, Dezful (IR); Reza Khoramian, Dezful (IR); Ahmad Ramazani S. A., Tehran (IR)

(72) Inventors: Saeed Golshokooh, Dezful (IR); Reza Khoramian, Dezful (IR); Ahmad Ramazani S. A., Tehran (IR)

( * ) Notice: Subject to any disclaimer, the term of this patent is extended or adjusted under 35 U.S.C. 154(b) by 308 days.

(21) Appl. No.: 15/135,191

(22) Filed: Apr. 21, 2016

(65) Prior Publication Data

US 2016/0341477 A1    Nov. 24, 2016

(51) Int. Cl.
    *B01D 39/20*    (2006.01)

(52) U.S. Cl.
    CPC ........ *B01D 39/201* (2013.01); *B01D 39/2003* (2013.01); *B01D 39/2006* (2013.01); *B01D 2239/1208* (2013.01); *B01D 2239/1241* (2013.01)

(58) Field of Classification Search
    CPC .............. B01D 39/2006; B01D 39/201; B01D 39/2003; B01D 2239/1241; B01D 2239/1208
    USPC ................................ 432/14, 13; 166/250.01
    See application file for complete search history.

(56) References Cited

U.S. PATENT DOCUMENTS

| | | | |
|---|---|---|---|
| 4,580,633 A * | 4/1986 | Watkins ................... | C09K 8/60 106/900 |
| 9,975,813 B2 * | 5/2018 | Koep ....................... | C04B 35/52 |
| 2006/0122071 A1 * | 6/2006 | Reddy ................... | C09K 8/5045 507/219 |

* cited by examiner

*Primary Examiner* — Steven B McAllister
*Assistant Examiner* — Benjamin W Johnson

(57) ABSTRACT

A method for fabrication of ordinary porous media and fractured porous media with controllable characteristics is disclosed. The method comprises the steps of: providing a cylindrical container and sealing one end of the cylindrical container. The method further comprises fastening the sealed end of the cylindrical container with a lacy sheet for connecting to a vacuum pump and packing the cylindrical container with glass beads to achieve predetermined porosity and permeability using vacuum. Finally placing the packed container in a furnace until reaching a retention time at a predefined rate of temperature enhancement, and separating a fabricated core from the packed container.

6 Claims, 11 Drawing Sheets

METHODS FOR FABRICATING POROUS MEDIA WITH CONTROLLABLE CHARACTERISTICS

BACKGROUND

The present invention generally relates to the study of multiphase fluid flows in porous media, specially related to methods associated with enhanced oil recovery. Enhanced oil recovery (EOR) or tertiary recovery generally targets recovery of immobile oil. EOR processes are used for recovering oil beyond secondary methods of oil recovery. EOR methods can be broadly classified into: a) thermal methods; b) gas injection methods; and c) chemical injection methods. Reservoir core plugs and outcrop core plugs are studied to investigate reservoir rock properties and mechanisms associated with water and gas based enhanced oil recovery.

Heavy hydrocarbons in the form of petroleum deposits and oil reservoirs are distributed worldwide. These oil reservoirs are measured in the hundreds of billions of recoverable barrels. The challenge to meet the ever increasing demand for oil includes increasing crude oil recovery from heavy oil reservoirs. This challenge has resulted in expanding efforts to develop alternative cost efficient oil recovery processes. Because heavy crude oil has a relatively high viscosity, it is essentially immobile and cannot be easily recovered by conventional primary and secondary means. Also, unconventional reservoir such as carbonated ones with fracture face to hardship experimental work and need to simulate unique mechanisms and conditions associated with them. Hence, there is a need in the art for new and improved means for tertiary recovery or enhanced oil recovery.

Oil is found in subterranean formations or reservoirs in which it has accumulated, and recovery is initially accomplished by pumping or permitting the oil to flow to the surface of the earth through wells drilled into the oil-bearing stratum. In the primary oil recovery stage, the recovery efficiency (RE) is influenced by the natural energy or drive mechanisms present, such as water drive, gas cap drive, gravity drainage, liquid expansion, relative permeability of reservoir formation, and combinations thereof within the formation and this natural energy is utilized to recover petroleum. In this primary phase of oil recovery, the oil reservoir natural energy drives the oil through the pore network toward the producing wells. When the natural energy source is depleted or in the instance of those formations which do not originally contain sufficient natural energy to permit primary recovery operations, some form of supplemental or artificial drive energy must be added to the reservoir to continue RE. Supplemental recovery is frequently referred to as secondary recovery, although in fact it may be primary, secondary or tertiary in sequence of employment. Enhanced recovery usually encompasses waterflooding or gas injection with or without additives, and other processes involving fluid or energy injection whether for secondary or tertiary oil recovery such as the use of steam or heated water.

Secondary recovery is a term utilized to mean any enhanced recovery first undertaken in any particular underground formation. Usually it follows primary recovery but can be conducted concurrently therewith to expedite production. Waterflooding is the most common method of secondary recovery.

Tertiary recovery refers to any enhanced recovery undertaken following secondary recovery. Broadly, tertiary recovery encompasses such procedures as miscible displacement, thermal recovery, or chemical flooding.

All of these procedures have been and, as noted, are being utilized to try to recover as much oil as possible from any given formation, but none is completely satisfactory. Many are expensive procedures not only in terms of equipment to be able to enhance the recovery, but also in terms of the chemicals and techniques utilized.

Significant challenges are associated with the recovery of hydrocarbon-containing substances such as crude oil from subterranean reservoirs. Subterranean reservoirs typically possess convoluted, fractured and crevassed bottom surface topographies wherein significant quantities of crude oil remain in locations that are inaccessible by conventional oil well extraction systems. Numerous strategies and technologies have been developed to increase the efficiency and extent of crude oil recovery from subterranean reservoirs. Such strategies include injecting water or steam or inert gas through well casings into the reservoirs to break up obstacles impeding the flow of crude oil to the well, or alternatively, to reduce the viscosity of the oil to increase its flowability.

Other strategies to increase the flowability of crude oil within subterranean reservoirs include applications of vibrational energies generated by: (a) seismic shock as a resulted of repeatedly dropping and raising a weight within a well casing, or (b) by lowering an ultrasonic wave generating device e.g., a transducer into a well casing and then manipulating the amplitude and frequency of the waves generated. However, significant volumes of crude oil remain inaccessible.

Dynamics of porous media is of intense research interest in petroleum engineering, geophysics, geotechnical engineering, water and pollution studies, and civil engineering. Demands from soil mechanics, oil production, modern earthquake and offshore engineering have further motivated the research on the dynamics of fluid-saturated porous media. Therefore, there exists a need in the art for improved methods for the design and fabrication of porous media for use in enhanced oil recovery.

SUMMARY OF THE INVENTION

The present invention relates to a method for fabrication of porous media with controllable characteristics, the method comprising the steps of: 1) removing humidity from glass beads by placing in an oven for 30 minutes at 100 degrees Celsius and categorizing the glass beads according to sizes related to rock porosity and permeability, after cooling to room temperature. In an embodiment, the glass beads are categorized into sizes ranging from 40 µm to 500 µm. 2) selecting a cylindrical container capable of withstanding temperature up to 1200 degrees Celsius and filling glass beads into the container.

One aspect of the present disclosure is directed to a method of making porous media with controllable characteristics for use in enhanced oil recovery, the method comprising: removing humidity from glass beads by placing them in an oven for 30 minutes at 100 degrees Celsius; cooling the glass beads to room temperature and categorizing the glass beads according to size, rock porosity and permeability; selecting a cylindrical container capable of withstanding temperature up to 1200 degrees Celsius; filling glass beads into the container and sealing one end of the container; fastening the sealed end of the cylindrical container with a metal network sheet, wherein the sealed end of the cylindrical container is connected to a vacuum pump via a plurality of plastic tubes of different sizes; packing the glass beads into the container so as to achieve predetermined porosity and permeability; placing the packed containers in a furnace until a retention time is reached at a predefined rate of temperature enhancement; and separating the fabricated porous media from the packed container and cutting top and bottom ends of the fabricated porous media.

In one embodiment, the glass beads range in size from 40 µm to 500 µm in diameter. In another embodiment, the cylindrical container is made of glass, ceramic, steel and/or copper. In one embodiment, one end of the cylindrical container is sealed using a fine net, glue and/or paper. In one embodiment, the metal network sheet comprises cupric, iron, steel, or any combination thereof. In another embodiment, the rate of temperature enhancement is 5 degrees Celsius per minute.

One aspect of the present disclosure is directed to a method of making fractured porous media with controllable characteristics, the method comprising: providing a cylindrical glass tube and sealing one end of the glass tube with mud; placing the glass tube in a furnace at temperature of 500 degrees Celsius until the mud is attached and dry; fastening the sealed end of the glass tube comprising dried mud with a lacy sheet for connecting to a vacuum pump; packing the glass tube with glass beads to achieve a predetermined porosity and permeability; polishing the packed glass tube using mud; placing the polished glass tube in the furnace until reaching a retention time at a predefined rate of temperature enhancement; soaking the mud-covered glass tube in a water bath and trimming the mud from the glass tube; and obtaining a fractured porous media with controllable characteristics.

In one embodiment, the method of the present disclosure further comprises threading the outer sides of glass tube for fixing inlet and outlet caps. In one embodiment, the threading is done by lathing. In one embodiment, the fastened end of the glass tube is connected to the vacuum pump via a plurality of plastic tubes of different sizes. In one embodiment, the rate of temperature enhancement is 5 degrees Celsius per minute. In another embodiment, the glass beads are packed using a rubber hammer.

One aspect of the present disclosure is directed to a method for fabricating a fractured porous media, comprising: fabricating an artificial core sample using a porous media; providing a Plexiglas container with an inner diameter bigger than the fabricated core; threading the outer ends of the Plexiglas container for screwing an inlet and an outlet cap; placing the fabricated core into the Plexiglas container for fracturing; and screwing the inlet cap and the outlet cap to the ends of Plexiglas container.

In one embodiment, the porous media comprises glass beads. In another embodiment, the inlet and outlet caps comprise a distributary configured for uniform scattering of fluids. In one embodiment, the fabricated core is refrigerated for 12 hours prior to placing it inside the Plexiglas container. In one embodiment, the Plexiglas container is treated in an oven at about 50 degrees Celsius for about one hour prior to placing the fabricated core inside the Plexiglas container. In another embodiment, the threading the outer ends of the Plexiglas container is done using diamond blades. In another embodiment, the outer ends of the Plexiglas container are threaded by lathing.

The cylindrical container can be constructed using materials selected from a group consisting glass, ceramic, steel and copper. In one example, one end of the container is sealed. One end of the cylindrical container can be in contact with a metal network sheet and connected to a vacuum pump. Sealing can be done using a fine net, glue and paper.

The metal network sheet may comprise cupric, iron, steel and its combinations. Packing the glass beads into the cylindrical container is performed, so as to achieve predetermined porosity and permeability. In one embodiment, the desired properties of artificial core such as minimum porosity and permeability can be achieved by using a rubber hammer or a mechanical shaker. In one example, the packed cylindrical containers are placed in a furnace until reaching a retention time at a predefined rate of temperature enhancement. The rate of temperature enhancement can be about 5 degrees Celsius per minute. The fabricated core can then be separated from the packed container, and the top and bottom ends of the fabricated core may be cut. The porous media may comprise glass beads or glass beads with a combination of minerals.

In another embodiment, the present invention relates to a method for fabrication of fractured porous media with controllable characteristics, the method comprising the steps of: providing a cylindrical glass tube and sealing one end of the glass tube with mud; placing glass tube in a furnace at temperature of 500 degrees Celsius to dry the mud; fastening the sealed end of the glass tube comprising dried mud with a lacy sheet for connecting to a vacuum pump; packing the glass tube with glass beads to achieve predetermined porosity and permeability; polishing the packed glass tube using mud; placing the polished glass tube in the furnace until reaching a retention time at a predefined rate of temperature enhancement; and trimming the mud into and around the glass tube after soaking in a water bath to obtain a fabricated fractured core.

BRIEF DESCRIPTION OF SEVERAL VIEWS OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION

Figure 1:
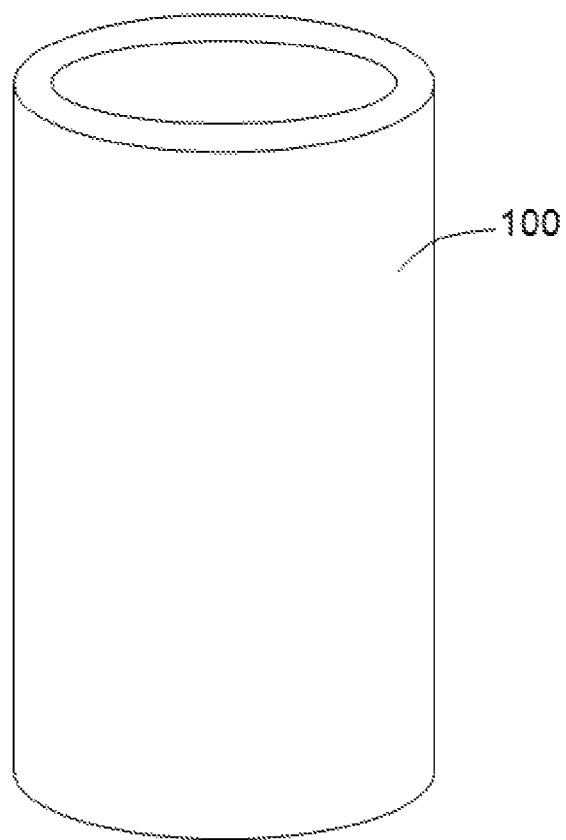
FIG. 1 illustrates a perspective view of a cylindrical ceramic container.

The present invention generally relates to methods associated with enhanced oil recovery. More specifically, the present disclosure relates to new and improved methods for designing and fabricating synthetic cores from porous media, having controllable characteristics. Further still, the present invention discloses methods of fabricating artificial core samples using porous media for investigating reservoir rock properties, in order to investigate improved techniques for enhanced oil recovery.

In the first stage of hydrocarbon recovery an energy source present in a reservoir is allowed to move to a producing well(s) where the hydrocarbon can flow or be pumped to a surface handling facility. Typically, a relatively small proportion of reservoir hydrocarbon can be recovered by this means. To increase production fluids are injected down adjacent wells to force an additional amount of hydrocarbon to the surface. This is commonly known as secondary recovery. The fluids normally used are water (such as aquifer water, river water, sea water, or produced water), or gas (such as produced gas, carbon dioxide, flue gas and various others). Additionally, if the fluid encourages movement of normally immobile residual oil or other hydrocarbons, such a process is termed tertiary recovery.

In the production of minerals, e.g., oil and gas, certain reservoir properties of a subterranean reservoir must be determined. Two of the most important of these properties are the porosity and permeability of the reservoir. Porosity of a material is the ratio of the aggregate volume of its void or pore spaces (i.e., pore volume) to its gross bulk volume and, in the case of an oil or gas reservoir, is a measure of the capacity within the reservoir rock which is available for storing oil or gas. Permeability of a material is a measure of the ability of the material to transmit fluids through its pore spaces and is inversely proportional to the flow resistance offered by the material. Another important parameter is pore compressibility, which is change in porosity, or pore and bulk volume, as a function of pressure.

A knowledge of the pore size distribution and which pores contain hydrocarbons is useful to reservoir engineers in designing means for efficiently recovering crude oil from such reservoirs. This knowledge is of particular importance in tertiary oil recovery in the selection of appropriate flooding materials to recover the crude oil remaining after primary and secondary recovery techniques have either been employed or are considered unsuitable.

Direct methods are available for measuring rock properties. A conventional direct method typically involves obtaining specimens of the rock to be evaluated and performing laboratory experiments on those specimens. One example of such an experiment is coring, a process by which intact rock specimens can be obtained from an oil and gas well. For example, a "whole core" is obtained by using a special drill bit that cuts a cylinder of rock over the interval of interest. The total cylinder can be on the order of four inches in diameter and hundreds of feet long. For handling purposes, the core may be cut into three foot lengths. From those lengths, short plugs of 1" to 1.5" diameter are then taken for the laboratory tests. Because different laboratory tests require different sizes, shapes, and orientation of the samples relative to the original rock, several samples are typically prepared from a region of the core that appears to be similar.

For example, it is useful to know both the horizontal and vertical permeabilities of a reservoir rock. To obtain these properties in the physical lab, one reservoir rock sample must be cut perpendicular to the core's axis, whereas another reservoir rock sample must be cut parallel to the core's axis. Laboratory tests are then performed on the samples to yield the permeability in one direction based on the cut. However, there is no assurance that the obtained reservoir rock samples contain identical rock properties even though the samples came from the same region of the core and are visibly similar.

Actual core samples can be made using porous (fractured) media such as silica, quartz, sand, calcite, dolomite, glass beads, glass tube, ceramic tube, cupric and plexiglas tube, with the help of furnace and other accessories. Modeling the porous media needs homogenous samples in order to omit certain complexity. But reservoir outcrop cores and even synthetic cores exhibit high heterogeneity. By controlling parameters such as composition, size and geometry of minerals, packing procedure, temperature and retention time of sample in the furnace, it can result in formation of cores with specified porosity, permeability and to bear confining pressure.

Generally synthetic cores when used for flooding one concentration are subjected to sedimentation and absorption phenomena, hence the same core will not be appropriate for using at other concentrations. In such cases, a new core which is exactly similar to the previous core is generally required. In prior art methods, synthetic cores samples produced using sand and glue lack desired properties such as regular geometry, net geometry and cost effectiveness, which is required for effective modeling.

Typically, porous media are produced by packaging grains alone or packaging grains followed by fastening with glue. Fabricating porous media only by packaging may result in change of permeability and porosity during flooding and the end results are not reliable. In case of porous media fastened using glue, washing and cleaning the porous media with solvent like acetone or toluene will remove the glue which might result in change in porosity and permeability.

Many reservoirs from which oil and gas are produced are not homogeneous in the geologic properties (e.g. porosity and permeability). In fact, many of such reservoirs, especially those consisting of carbonate type of rocks (e.g. limestone and dolomite) are naturally and significantly fractured. In addition, often in carbonate reservoirs the rock matrix is fractured deliberately by well treatments in order to increase the flow of fluids near the well bore region. Most of the universal oil reservoirs are depleted sandstone, whereas unconventional oil reservoirs (mostly carbonate) are fresh with complex production condition. This leads the industry to concentrate on conventional reservoir models due to shortage of a suitable fractured reservoir model.

Due to reasons such as high cost associated with obtaining deep reservoir core plug samples and lack of proper outcrops, artificial cores which possess similar properties to actual cores samples were used for investigating enhanced oil recovery mechanism. Actual core samples can be made using porous (fractured) media. Typically, porous media are produced by packaging grains alone or packaging grains followed by fastening with glue. Fabricating porous media only by packaging may result in change of permeability and porosity during flooding and the end results are not reliable. In case of porous media fastened using glue, washing and cleaning the porous media with solvent like acetone or toluene will remove the glue which might result in change in porosity and permeability.

One aspect of the present disclosure is directed to the design and fabrication of ordinary porous media. This was carried out using two methods: direct method and indirect method.

In an embodiment, the present invention relates to a direct method for fabrication of porous media with controllable characteristics. In particular, one example of the present disclosure is directed to a method of making porous media with controllable characteristics for use in enhanced oil recovery. This method comprises removing humidity from glass beads by placing the glass beads in an oven for about 30 minutes at about 100 degrees Celsius and subsequently cooling the glass beads to room temperature. The glass beads are then categorized according to their size, rock porosity and permeability. The glass beads are then filled into a cylindrical container that is capable of withstanding temperature up to 1200 degrees Celsius. One end of this container is then sealed, and the sealed end is then fastened with a metal network sheet. In this example, the sealed end of the cylindrical container is connected to a vacuum pump via a plurality of plastic tubes of different sizes. The vacuum allows for better packing and results. In particular, the packing of the glass beads into the container is done, so as to achieve a predetermined porosity and permeability. The packed containers are then placed in a furnace until a retention time is reached at a predefined rate of temperature enhancement. In another step of this example, the fabricated porous media is then separated from the packed container and the top and bottom ends of the fabricated porous media is cut as desired.

In another example, the method comprises 1. removing humidity from glass beads by placing in an oven. In an embodiment, the glass beads can be kept in the oven for 30 minutes at 100 degrees Celsius; 2. categorizing glass beads according to sizes related to rock porosity and permeability, after cooling to room temperature; 3. providing a cylindrical container capable of withstanding high temperature such as temperature up to 1200 degrees Celsius; 4. filling the categorized glass beads into the container and sealing one end of the container using fine net, glue and paper; 5. fastening the sealed end of the cylindrical container with metal network sheet such as copper, iron or steel, for connecting to a vacuum pump; 6. packing the glass beads into the container so as to achieve predetermined porosity and permeability using the vacuum pump; 7. placing the containers packed with glass beads in a furnace until reaching a retention time at a predefined rate of temperature enhancement; and 8. separating fabricated core from the packed container and cutting top and bottom ends of the fabricated core.

The glass beads are treated in an oven and cooled down till they reach room temperature. They are then categorized into sizes ranging from about 40 μm to about 500 μm based on desired porosity and permeability properties of the artificial core. The cylindrical container can be made of materials such as glass, ceramic, steel and copper. FIG. 1 shows a perspective view of a cylindrical container 100 made of ceramic, wherein the cylindrical container is capable of withstanding temperature up to 1200 degrees Celsius.

Figure 2:
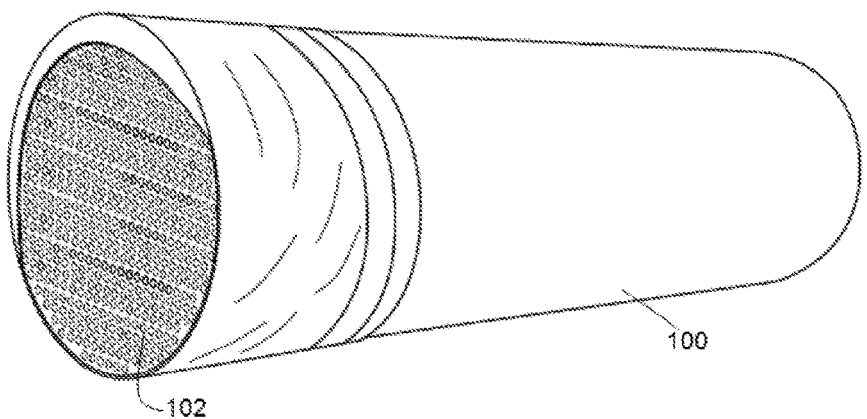
FIG. 2 illustrates a perspective view of the cylindrical ceramic container sealed with fine net at one end.
Figure 3:
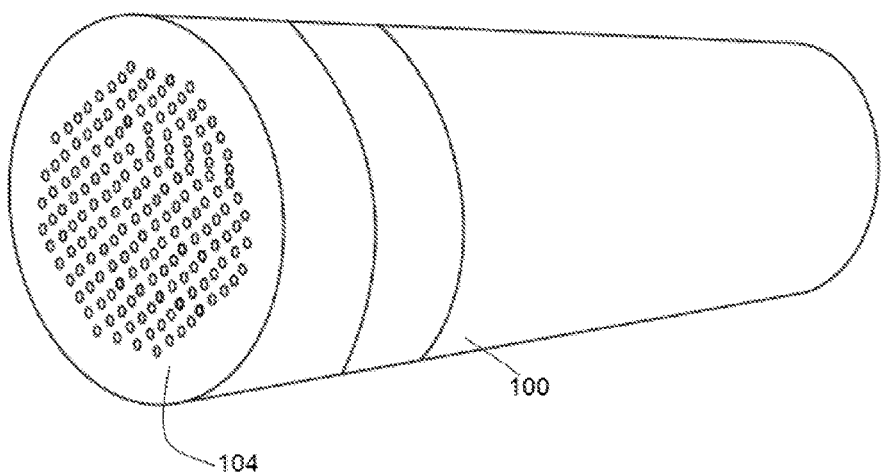
FIG. 3 illustrates a perspective view of the cylindrical ceramic container fastened with copper network sheet.
Figure 4:
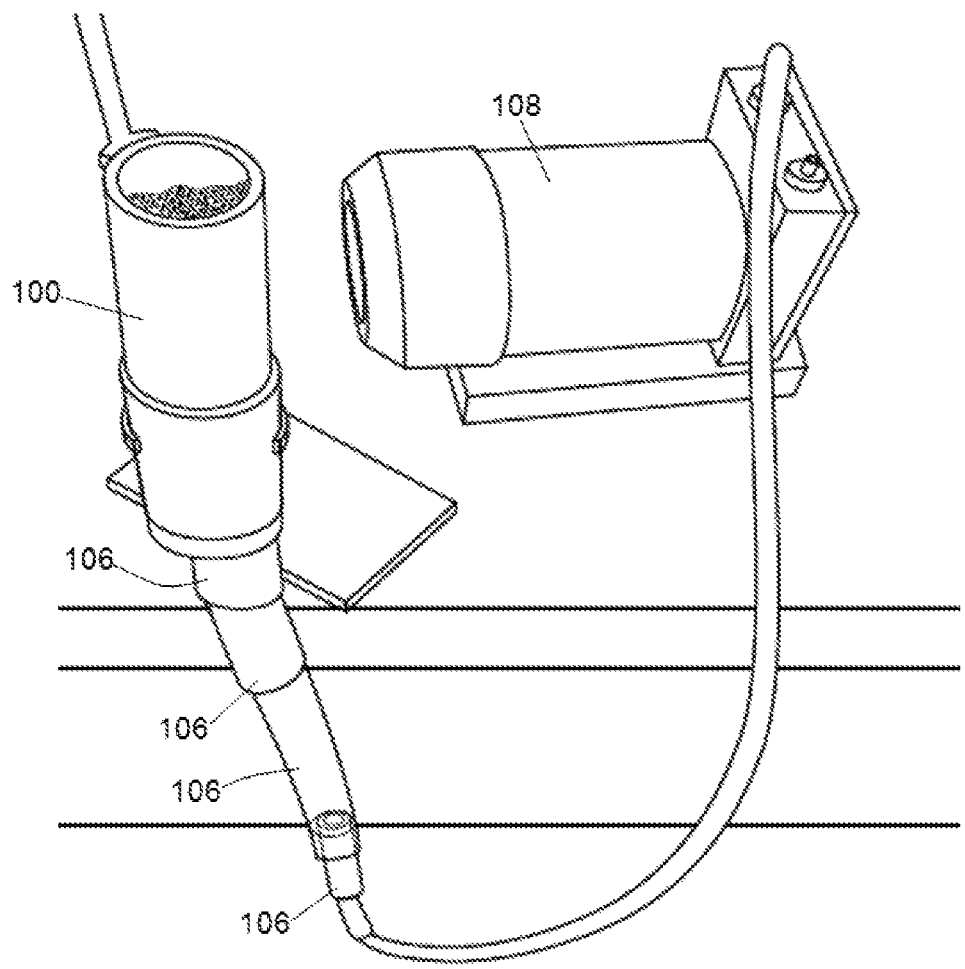
FIG. 4 illustrates the fastened end of the cylindrical ceramic container connected to a vacuum pump.

One end of the cylindrical container 100 is partially sealed with fine net 102 as shown in FIG. 2 using materials such as paper and glue. The sealed end of the cylindrical container 100 is fastened with perforated metal sheet 104 as shown in FIG. 3 in order to have a fixed and solid porous media. The perforated metal sheet comprises cupric, iron, steel, and any combination thereof. The fastened end of the cylindrical container 100 is connected to the vacuum pump 108 via a plurality of plastic tubes 106 of different sizes as shown in FIG. 4. The glass beads are strewn into the cylindrical tube 100 after ensuring the suction pressure of the vacuum pump 108.

Packing procedure has an effect on porosity and permeability. Properties such as minimal porosity and permeability can be achieved by using a rubber hammer or a mechanical shaker. In one example, a rubber hammer may be used to pack or help pack the glass beads. Another way to achieve least porosity and permeability involves switching the vacuum pump on and off several times to induce shock to the glass beads and this was found to cause the beads to compact better. In order to prevent the derangement of the beads, vacuum pump was kept on while disconnecting the plastic tubes.

The glass beads can range in size from about 40 μm to about 500 μm in diameter. The cylindrical container may be made of glass, ceramic, steel and/or copper. One end of the cylindrical container may be sealed using a fine net, glue and/or paper. The metal network sheet may comprise cupric, iron, steel, or any combination thereof. The rate of temperature enhancement may be about 5 degrees Celsius per minute.

The average softening temperature of glass beads was about 700 degrees Celsius. The desired properties of the artificial core such as porosity and permeability can be achieved by treating the packed glass beads in a furnace set in a temperature range of about 650 to about 750 degrees Celsius. High temperature and increased retention time results in tighter core samples with decreased porosity and permeability. Retention time obeys the furnace condition; in one example, about 15 minutes is needed to penetrate the heat into the central part of sample. To reach tighter core, retention time is about one hour. However, typically more than about one hour at high temperature (750 degrees Celsius), the glass beads reach flowing conditions and the desired porous media is not achieved. On the other hand, if the time is less than about 15 minutes at low temperature (650 degrees Celsius), in one example, the porous media that forms is weak. As such, in one example, to achieve the desired properties of the artificial core, the packed glass beads are placed in a furnace at the temperature of about 700 degrees Celsius for about 30 minutes.

There are two factors that affect the porosity and permeability of samples after putting into the furnace: namely a) temperature and b) retention time. There are limitations for increasing temperature because of the flowing temperature. That is, for example, it was determined that at the temperature of more than 750° C. (based on the quality of glass beads), no porous media existed because the glass beads converted to frit. The retention time is also a factor affecting porosity and permeability. In one example, the packed glass beads are placed in a furnace at the temperature of about 700 degrees Celsius for about 15 minutes. In another example, the packed glass beads are placed in a furnace at the temperature of about 700 degrees Celsius for about 45 minutes. In another example, the packed glass beads are placed in a furnace at the temperature of 680 to 700 degrees Celsius for 20 to 40 minutes. Although leaving the glass beads at about 750 degrees for over one hour is not preferred because the desired porous media is not achieved, it was found that Pyrex glass beads have less softening time compared with quartz glass beads. In one example, lower than 650 C., 15 min the porous media not fixed; 680 C., 15 min minimum porosity and permeability; 700 C., 30 min desired and common core; 720 C., 1 hr tight core; and 750 C., 1 hr no porous media.

By having a temperature of 680 C. with a retention time of 15 minutes, according to kind of glass beads and other minerals, this condition is the minimum time for obtaining rigid porous media (the glass beads attach only by external boundary and the geometry of glass beads is spherical without any changes or overlap). In another example, the temperature is 680 to 700 degree Celcius and retention time is about 30 minutes. Under such conditions, larger volume of pores and porosity and permeability are high. But by increasing temperature, the geometry will change and glass beads enter each other and caused low porosity and permeability (for example, in conditions where temperature is 720 degrees Celsius and retention time is 60 or more minutes).

In the context of the presently disclosed invention, for making porous media two factors were found to determine the quality of the porous media obtained: 1) the temperature and rate of temperature enhancement and 2) retention time. Factors affecting fabrication of porous media were found to include: 1) the kind of glass beads (glass beads with more impurity affect the reached porosity and permeability), 2) the size and sorting of glass beads (certain distribution of glass beads have less porosity and permeability because small glass beads enter vacant space between bigger glass beads), 3) the geometry of the glass beads (glass beads with irregular shape caused more porosity and permeability), 4) packing procedure (more densely packed porous media result in low porosity and permeability), 5) temperature and 6) retention time.

In order to reach a homogenous condition, the rate of temperature enhancement was kept slow, for example, around 5 degrees Celsius per minute. For temperature to penetrate into the samples, retention time is required, which varies according to samples. In an embodiment, high temperature and retention time resulted in less porosity and permeability. The temperature and retention time were as follows: temperature was between 650 to 750 degrees Celcius, and the retention time was between 15 minutes and 60 minutes. Under such conditions, a high degree range of porosity and permeability was found to be present. If temperature was less than 680 degrees Celsius and retention time was 15 minutes or less, a much higher level of porosity and permeability was achieved (porosity=35% and permeability=1 darcy) and if temperature was 720 degrees Celsius and retention time was 1 hour, a much lower level of porosity and permeability was obtained (porosity 11% and permeability 5 milidarcy). The furnace is extinguished after reaching the desired temperature. After extinguishing the furnace, the sample is cooled slowly, for example, the sample containing containers are cooled slowly for a period of 24 hours.

Figure 5:
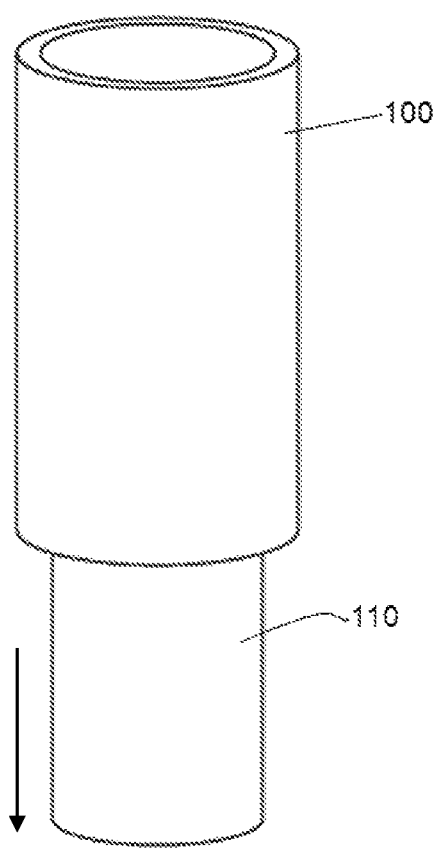
FIG. 5 illustrates an artificial core separated from the cylindrical ceramic container.
Figure 6:
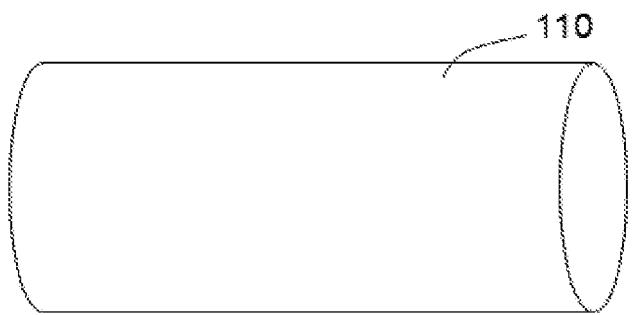
FIG. 6 illustrates a perspective view of the artificial core with ends trimmed.

After cooling the cylindrical containers 100, the core samples 110 were separated from the containers 100 without any damage by shaking the container 100 for a period of about 30 minutes. FIG. 5 shows the artificial core sample 110 being separated from the cylindrical ceramic container 100. Usually, the top and bottom ends of the core samples 110 were not smooth. The ends of the core samples 110 were sliced off using a cutter machine. FIG. 6 shows a perspective view of the core sample 110 with ends trimmed. The ends of the core samples were sliced in order to investigate their wettability.

In one example of the present disclosure, the porous media can be fabricated using an indirect method. The indirect method differs from the direct method on aspects such the size of containers used for fabricating a whole core and in the coring process itself. Inner diameter of the containers are equal to a whole artificial core to be strewn with glass beads. The whole artificial core sample for drilling can be fabricated using a 4 inch container. In addition, core samples with normal standard size of 1.5 inch can also be made using a cutting bit.

Design and fabrication of fractured porous media can be categorized into two parts: 1. first viewpoint; and 2. second viewpoint.

In another embodiment, the present invention relates to a method for fabrication of fractured porous media with controllable characteristics based on the first viewpoint, the method comprising the steps of: 1. providing a cylindrical glass tube and sealing one end of the glass tube with mud; 2. placing glass tube in a furnace at a temperature of about 500 degrees Celsius for attaching and drying the mud; 3. fastening the sealed end of the glass tube comprising dried mud with a lacy sheet for connecting to a vacuum pump; 4. packing the glass tube with glass beads to achieve predetermined porosity and permeability; 5. polishing or covering the packed glass tube using mud; 6. placing the polished glass tube in the furnace until reaching a retention time at a predefined rate of temperature enhancement; and 7. trimming the mud into and around the glass tube after soaking in a water bath to obtain a fabricated core.

In one example, the present disclosure is directed to a method of making a fractured porous media with controllable characteristics. The method comprises providing a cylindrical glass tube and sealing one end of the glass tube with mud, and placing the glass tube in a hot furnace (for example, at a temperature of about 500 degrees Celsius) until the mud is attached and dry. The sealed end of the glass tube comprising dried mud is then fastened with a lacy sheet for connecting to a vacuum pump. In this example, the glass tube is then packed with glass beads to achieve a predetermined porosity and permeability, and subsequently polished using mud. The glass tube is then placed in the furnace until reaching a retention time at a predefined rate of temperature enhancement. After it is removed from the furnace, the mud-covered glass tube is then soaked in a water bath and the mud is trimmed from the glass tube. By way of this example, it is possible to obtain a fractured porous media with controllable characteristics.

Prior art media fabricate porous media in two ways: 1) using two Plexiglas with different size in diameter, or 2) using reservoir cores and Plexiglas or metal holder for high pressure and temperature. 1) Using the two plexiglas with different diameter size: in this way, two different sizes in diameter of tubes are selected. The tube with the smaller diameter is put into the tube with the larger diameter. The space between the two tubes (annulus) plays the role of the fracture. To initiate the communication between two tubes, several holes are pierced on the outer boundary of small tube (usually done by laser machine). It should be noticed that the holes are smaller than the used sand beads for fabricating porous media to prevent the migration of the beads with fluid flow into porous media. For example, if the diameters of the beads are 0.2 mm, the holes on the inner tube are 0.1 mm. The disadvantage of this approach is similar to the disadvantage associated with ordinary sand pack methods. These include not fixing of the porous media caused by no tenacity factor, high porosity and permeability (more than 1 Darcy), and the inability to reproduce the repeatability property for next test because, inter alia, of the need for packing for fabricating porous media after cleaning porous media with solvents. Another disadvantage of fractured sand pack model are the holes. The communication between porous media and fracture is done by holes but in actual media, this connection is done with all surfaces of porous media.

In contrast, the artificial fractured porous media and related methods as taught herein solve much of the disadvantages associated with existing prior art methods. For example, the presently disclosed methods enable the desired porosity and permeability and good repeatability properties during many flooding and cleaning steps with solvents. Moreover, the communication between porous media is from all over the porous media, exactly the same as actual fracture porous media. This is a significant improvement over existing protocols and porous media. Also, the different kind of glass tube and glass beads as disclosed herein enable the creation of a fractured media (no fastening of the glass beads on the inner diameter of the glass tube). In one example, the actual and more abundant fracture size is 200 micron and the presently disclosed samples have these properties.

Using the reservoir cores and Plexiglas or metal holder for high pressure and temperature (2)): in this way, an actual reservoir core is used and put it into a plexiglas or a metal holder. Before putting the core into the plexiglas, it needs to be saturated totally by a fluid (for the starting core flooding the core must be saturated 100% by oil or water). In the next step, the core diameter is cut from top to down, or cut horizontally to create a vertical or horizontal fracture respectively. The main disadvantage of this approach is that it is not easy to saturate the fracture cores with 100% of fluids caused by low resistance of fracture for fluid flow. Another approach is to put a core into a metal holder using a specific substance around the core. The specific substance is around the core at atmospheric temperature and the samples can be saturated from fluids. To create fractures, the temperature is raised and the specific substances are removed and a fracture is applied. However, this approach is both time consuming, very expensive and not exact. Moreover, high temperature may damage fluids into the sample.

The method of the present disclosure may further comprise threading the outer sides of glass tube for fixing inlet and outlet caps. The threading may be done by lathing. The fastened end of the glass tube may be connected to the vacuum pump via a plurality of plastic tubes of different sizes. The rate of temperature enhancement may be 5 degrees Celsius per minute.

Figure 7:
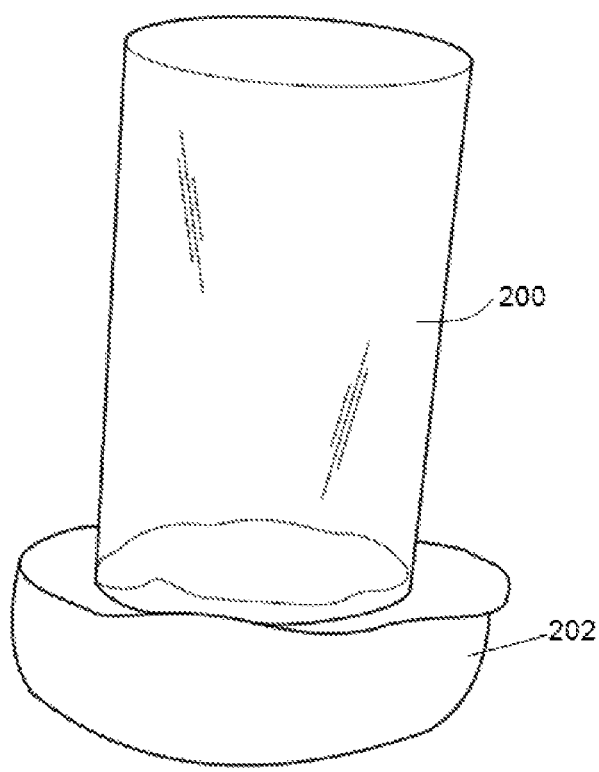
FIG. 7 illustrates a cylindrical glass tube sealed with mud at one end.

Glass beads or a combination of minerals with glass beads and a glass tube can be used to construct a fractured porous media. Sealing one end of the glass tube with mud is required for suspending the glass beads in the center of the glass tube so as to leave a space towards both ends for threading to fit inlet and outlet caps. FIG. 7 shows a glass tube 200 with one end sealed with mud 202. In order to dry and attach the mud 202 to the inner wall of the glass tube 200, the glass tube 200 sealed with mud 202 is placed in the furnace at 500 degrees Celsius. After 12 hours, the glass tube 200 is cooled to reach room temperature.

Figure 8:
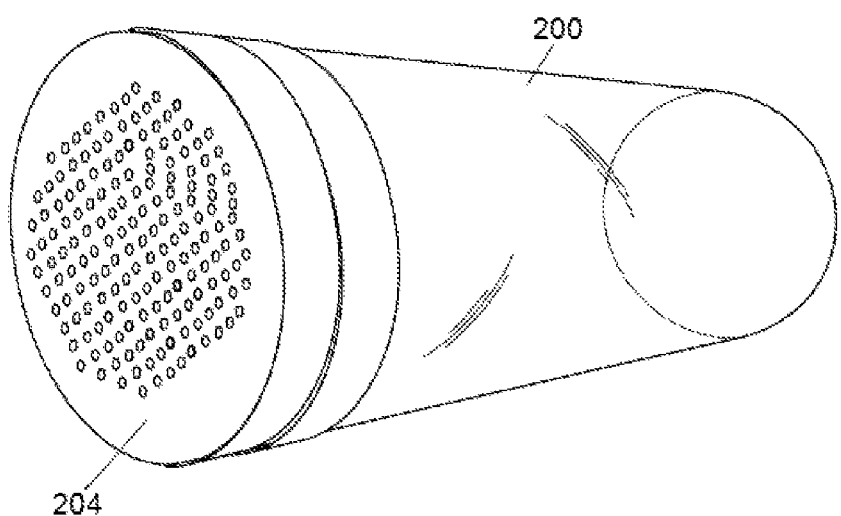
FIG. 8 illustrates the cylindrical glass tube fastened with a lacy sheet on the dried mud.

FIG. 8 shows sealed end of the glass tube 200 fastened with a strong lacy sheet 204. The use of strong lacy sheet 204 prevents the dried mud 202 from being sucked into the vacuum pump which could lead to subsequent damage to the vacuum pump. Packing of the glass tube 200 with glass beads 210 can be done by shaking the glass tube 200 with a rubber hammer.

Figure 9:
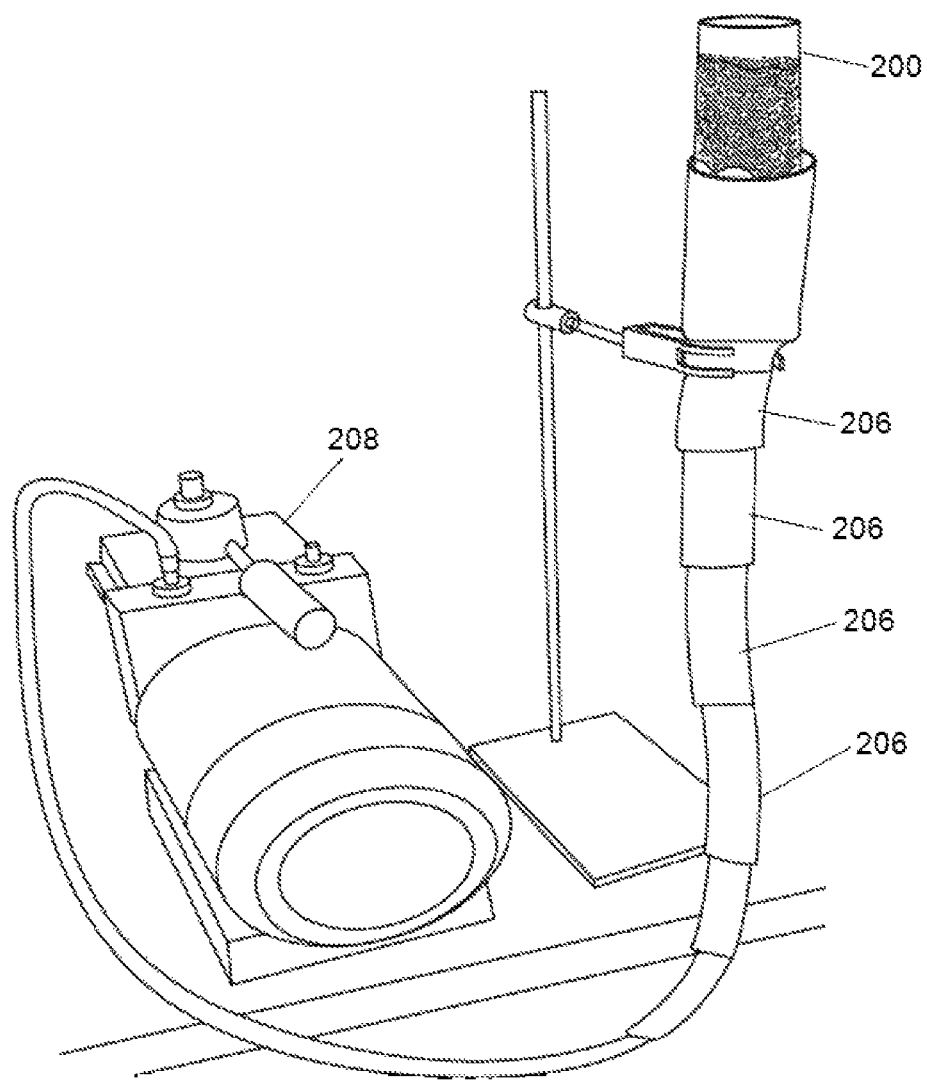
FIG. 9 illustrates the fastened end of the cylindrical glass tube connected to a vacuum pump.

The fastened end of the glass tube 200 is connected to the vacuum pump 208 via a plurality of plastic tubes 206 of different sizes as shown in FIG. 9. The glass beads 210 are strewn into the glass tube 200 after ensuring the suction pressure of the vacuum pump 208. The packing procedure of the presently disclosed method creates the desired porosity and permeability. Properties such as minimal porosity and permeability can be achieved by using a rubber hammer to shake the glass tube 200 so that the glass beads 210 are distributed and packed to the desired level. Another way to achieve least porosity and permeability involves switching the vacuum pump 208 on and off several times to induce shock to the glass beads 210 and to better compact the glass beads. In order to prevent derangement of the beads, vacuum pump was on while the plastic tubes were disconnected.

In an embodiment, the inlet diameter of vacuum pump is 1 cm whereas the diameter of the glass tube is 50 cm. The glass tube 200 is connected to the inlet of the vacuum pump 208 via a series of plastic tubes of different diameters and sizes. Since, the glass tube 200 is too delicate material to treat in a furnace, the outer surface of the glass tube 200 is covered with mud in order to render the glass tube 200 resistant to damage due to heating. The mud polished glass tube is placed in furnace until reaching a retention time at a predefined rate of temperature enhancement. High temperature and increased retention time lead to formation of tighter samples with less porosity and permeability.

Main factors influencing the fabrication of fractured porous media comprise: 1) rate of temperature enhancement and 2) retention time. In order to reach a homogenous condition, the rate of temperature enhancement is kept slow, for example around 5 degrees Celsius per minute. For temperature to penetrate into the samples, retention time is required, which varies according to samples. In an embodiment, high temperature and retention time result in less porosity and permeability. The furnace is extinguished after reaching the desired temperature.

Figure 10:
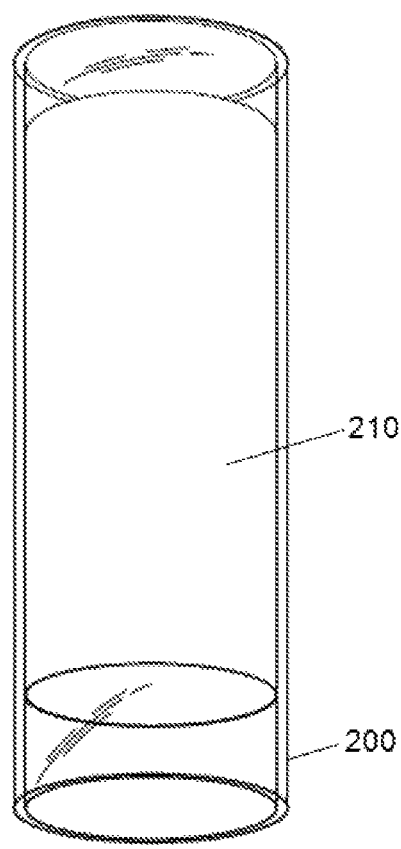
FIG. 10 illustrates the cylindrical glass tube packed with glass beads after trimming the mud from the sealed end.

After extinguishing the furnace, the sample is cooled slowly, for example, the sample containing glass tubes are cooled slowly for a period of 24 hours. The sample containing glass tubes are placed in a water bath for a period of time, which allows soaking of the mud around the glass tube. The mud around and into the glass tube are trimmed. FIG. 10 shows the glass tube 200 packed with core sample 210 after trimming the mud into and around the glass tube 200.

The method of fabricating a porous media further comprises the step of threading the outer ends of the glass tube 200 by lathing. The outer ends of the glass tube 200 are threaded for removably attaching the inlet cap and outlet cap.

In another embodiment, the present invention relates to a method for fabricating a fractured porous media according to the second viewpoint, the method comprising the steps of: fabricating an artificial core sample using a porous media; providing a Plexiglas container with an inner diameter bigger than the fabricated core; threading the outer ends of the Plexiglas container for screwing an inlet and an outlet cap; placing the fabricated core into the Plexiglas container for fracturing; and screwing the inlet cap and the outlet cap to the ends of Plexiglas container.

Figure 11:
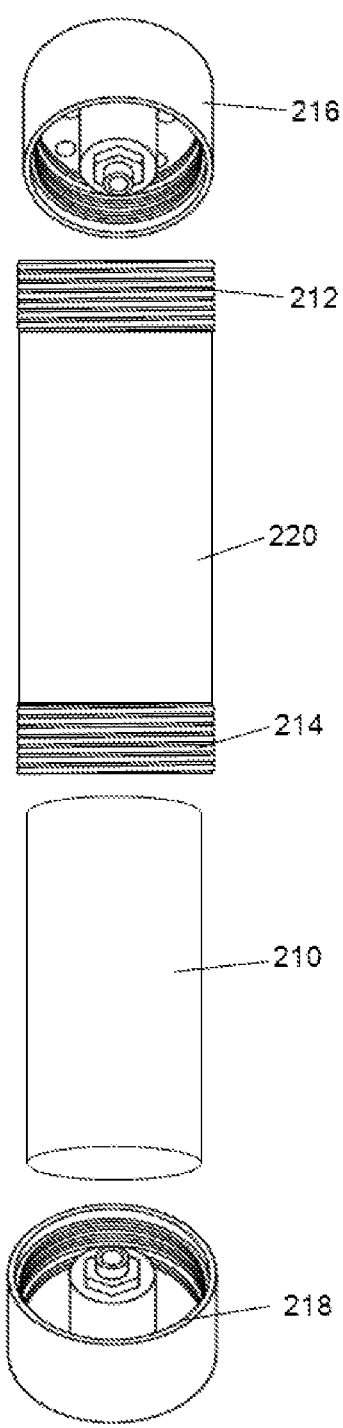
FIG. 11 illustrates a Plexiglas tube with threaded ends and inlet, outlet caps unscrewed from the threaded ends.

In an exemplary embodiment, the Plexiglas container comprises a Plexiglas tube. FIG. 11 shows an exploded view of a Plexiglas tube 220 with threaded outer ends 212, 214, comprising the fabricated artificial 210. The inlet and outlet caps 216, 218 are configured to be removably fixed to the threaded outer ends 212 and 214. The inlet and outlet caps 216, 218 comprise a distributary configured for uniform scattering of fluids. The methods disclosed in this invention utilize low price and industrial substances. The fabrication methods are easy with controllable effective parameters.

By controlling parameters such as composition, size and geometry of minerals, packing procedure, temperature and retention time of sample in the furnace, artificial cores with specified porosity and permeability can be fabricated. The porous media fabricated using the methods of present invention allows for improved methods for enhanced oil recovery (EOR). Advantages of the present invention include easy cleaning, no fine migration, ideal homogeneity, no shale, cores with constant porosity and permeability, easy wettability alteration and exact validation with modeling.

One of the synthetic cores (porosity=11.45, permeability=5.815 md) was tested by injecting air for 1 hour, brine 20000 ppm for 10 hours, and/or oil (oil field gravity=54.6 Cp) for 5 hours.

Easy cleaning: The above core was cleaned by acetone and toluene (Soxhlet apparatus) for 24 hours and then the porosity and permeability were measured. The results showed substantially similar porosity and permeability compared to the first step. Cleaning was done for about 1 hour. To investigate the core behavior in face of solvents use for a long time, cleaning for a common core was for about 24 hours.

Constant porosity and permeability, no fine migration and bearing confining pressure: Injection pressure enhanced till 4000 psi (confining pressure or over burden pressure is usually at least 500 psi more than porous or injection pressure, 4500 psi, to simulate reservoir condition. Injection rate was 0.2 cc/min. overburden pressure or confining pressure was supported by a chamber that is around the core and porous pressure was applied by an injection pump). There was no physical damage and porosity and permeability didn't have tangible variation (actual cores typically don't bear this pressure, such as sand stone cores). The apparatus of above experiment is used in "core flooding testing" to simulate fluid flow into porous media.

Imbibitions test: Imbibitions test is a mechanism for the production of oil from reservoirs with active aquifers. After injecting oil and saturated oil with core flooding apparatus, synthetic core for spontaneous imbibition test was put into Amott cell (that is full of water) for 1 week. The observations proved that water enters the core and oil exists.

Wettability alteration: For investigation aging phenomena, the core was put into a furnace in 80 degrees centigrade for 20 days, into an oil bath in atmospheric pressure, and then an Amott cell test was done. Wettability alteration was seen because the oil production compared with imbibitions test was lower and demonstrated the core is oil wet.

To have wettability alteration substantially, some graphite was used to convert samples from water wet to oil wet or silica nanoparticles were used to obtain strongly water wet samples. This caused to have cores with oil wet properties. Usually, wettability alteration to oil wet is done by silane compositions or by soaking cores into the oil for several days that described in above section (for ordinary cores and samples). Some of the materials are glass beads, so the synthetic cores are water wet but some reservoirs, usually carbonated ones, are oil wet. Thus, to fabricate synthetic cores with oil wet properties using nanoparticles, it is necessary to create a film on flowing directions into porous media.

Ideal homogeneity and no shale is achieved by using the materials with specified size and geometry, so as to obtain the maximum homogeneity. This condition was confirmed under a microscope. Some actual samples were without shale and some of them were with shale. In order to fabricate shale core, adding shale materials was found to be the solution. Also, to model fluid flow, some simplification is desired and omitting shale can help the results of experiments and the modeling is representative and without difference.

Validation with modeling: pore network modeling is a new method for modeling porous media that model all pores and throats into porous media. However, actual cores need to apply some simplification because they involve modeling with all the complexity, like running process, and this can be difficult and sometimes end without result. So, some simplification such as pore geometry where there is a geometrical shape instead of irregular shapes. When experimental results are validated, there are some differences but there is a physical model that is a simplified without applying them in modeling, verification of experimental and modeling result are the same as each other and better modeling with real condition is obtained.

The materials used for fabrication of porous media may comprise minerals such as silica, quartz, sand, calcite, dolomite, glass beads, etc. Modeling the porous media generally requires homogenous samples in order to omit complexity. Using the porous media, two cores can be fabricated at a same time. Different parameter effects can also be studied using the porous media especially during nanofluid, polymer or surfactant injection. Usually, when a core is used to flood one concentration, the same core will not be appropriate to proceed for other concentrations and the used core is not appropriate for next concentration caused by sedimentation and absorption phenomena. Whereas by using the methods of the present invention, different cores with exact similarity to the previous one can be fabricated using the fractured porous media. This provides for a highly improved method for enhanced oil recovery.

During fabrication of an ordinary porous media or fractured porous media, fabricating only by packing might not fix the porosity and permeability properties of the sample, especially during flooding and also the results are not reliable. Fastening the porous media using glue may lead to a heterogeneous model. In addition, washing and cleaning the porous media with solvents like acetone or toluene will remove the glue and again porosity and permeability will be changed. Whereas in the present invention, the porous media are packed and fixed by heating in a particular way and hence cleaning with solvent will cause no effect on rock properties. Thus, a desired fixed porosity and permeability will be obtained.

In another example of the present disclosure, a method for fabricating a fractured porous media. The method comprises fabricating an artificial core sample using a porous media; and providing a Plexiglas container with an inner diameter bigger than the fabricated core. The outer ends of the Plexiglas container are then threaded for screwing an inlet and an outlet cap. The fabricated core is then placed into the Plexiglas container for fracturing. The inlet cap and the outlet cap are screwed in to the ends of Plexiglas container.

In a particular example, the porous media comprises glass beads. The inlet and outlet caps comprise a distributary configured for uniform scattering of fluids. The fabricated core may be refrigerated for 12 hours prior to placing it inside the Plexiglas container. The Plexiglas container may be treated in an oven at about 50 degrees Celsius for about one hour prior to placing the fabricated core inside the Plexiglas container. The threading the outer ends of the Plexiglas container may be done using diamond blades, and the outer ends of the Plexiglas container may be threaded by lathing.

The methods for fabricating porous media as disclosed in the present invention offer numerous advantages including controllable porosity and permeability according to size, packing, geometry and temperature. The porous media fabricated using the above methods allows the effect of different grain sizes to be investigated, and allows for easy wettability alterations and easy cleaning. Using the teaching of the present disclosure, it is possible to design and fabricate several porous media that have the same properties and are substantially identical to one another. The present invention offers design and fabrication of matrix block with different geometry in order to investigate shape factor effects. The methods of the present invention allow investigation of interaction between three forces such as capillary, viscosity and gravity, in reservoir and to find which of these conditions is dominant.

The porous media fabricated using the methods of the present invention allows investigation of the direction of fracture to study oil bridge, re-infiltration and re-imbibition. The fabricated porous media also allows professionals to investigate novel mechanisms that need high accuracy like nanofluid injection. Another advantage of the present disclosure is that the porous media can be made using the above methods and are highly cost effective materials and comprise commercial or industrial potential.

The methods of the present invention allow utilization of cheaper, regular geometry shaped materials for producing synthetic cores which are ideal for modeling. This is unlike prior art synthetic cores, which utilize sand or sand and glue. Glass beads can be used as a porous media as taught herein or as a bridging material for sand. In one embodiment, the glass beads are mixed with sand before being poured into the cylinder. The proportion of glass to sand would be known to one of skill in the art. The porous media offers no shale and fine migration.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

What is claimed is:

1. A method of making porous media with controllable characteristics for use in enhanced oil recovery, the method comprising:
   removing humidity from glass beads by placing them in an oven for 30 minutes at 100 degrees Celsius;
   cooling the glass beads to room temperature and categorizing the glass beads according to size, rock porosity and permeability;
   selecting a cylindrical container capable of withstanding temperature up to 1200 degrees Celsius;
   sealing one end of the cylindrical container and packing the cooled glass beads into the container so as to achieve predetermined porosity and permeability;
   fastening the sealed end of the cylindrical container with a metal network sheet;
   connecting the sealed end of the cylindrical container to a vacuum pump via a plurality of plastic tubes of different sizes;
   applying a vacuum to the cylindrical container with the vacuum pump;
   placing the container in a furnace until a retention time is reached at a predefined rate of temperature enhancement to thereby convert the glass beads packed into the cylindrical container into fabricated porous media;
   removing the container from the furnace after the retention time is reached;
   separating the fabricated porous media from the container; and
   cutting top and bottom ends of the fabricated porous media.

2. The method of claim 1, wherein the categorized glass beads range in size from 40 µm to 500 µm in diameter.

3. The method of claim 1, wherein the cylindrical container is made of glass, ceramic, steel and/or copper.

4. The method of claim 1, wherein the sealed end of the cylindrical container is sealed using a net, glue and/or paper.

5. The method of claim 1, wherein the metal network sheet comprises cupric, iron, steel, or any combination thereof.

6. The method of claim 1, wherein the rate of temperature enhancement is 5 degrees Celsius per minute.

* * * * *